United States Patent [19]
Yui et al.

[11] Patent Number: 5,382,283
[45] Date of Patent: Jan. 17, 1995

[54] INK CONTAINING PROPYLENE OXIDE/ETHYLENE OXIDE BLOCK COPOLYMERS FOR INK JET RECORDING

[75] Inventors: Toshitake Yui; Ken Hashimoto; Fuminori Koide; Yoshiro Yamashita; Akihiko Chujo, all of Minamiashigara, Japan

[73] Assignee: Fuji Xerox Co., Ltd., Tokyo, Japan

[21] Appl. No.: 972,843

[22] Filed: Nov. 6, 1992

Related U.S. Application Data

[63] Continuation-in-part of Ser. No. 871,173, Apr. 20, 1992, abandoned.

[30] Foreign Application Priority Data

Apr. 26, 1991 [JP] Japan .................. 3-122816
Nov. 15, 1991 [JP] Japan .................. 3-326720

[51] Int. Cl.$^6$ ............................. C09D 11/02
[52] U.S. Cl. ............... 106/22 R; 106/20 D; 524/505
[58] Field of Search ................. 524/505; 106/20 R-21 K

[56] References Cited

U.S. PATENT DOCUMENTS 4,923,515  5/1990  Koike et al. .............. 106/22
5,139,574  8/1992  Winnik et al. ............ 106/22

FOREIGN PATENT DOCUMENTS 62-11781  1/1987  Japan .
62-89776  4/1987  Japan .
1-25789   5/1989  Japan .

*Primary Examiner*—Paul Lieberman
*Assistant Examiner*—Margaret Einsmann
*Attorney, Agent, or Firm*—Oliff & Berridge

[57] ABSTRACT

An ink for ink jet recording contains a dye and water, a water soluble organic solvent which dissolves the dye, and 0.8 to 5 weight percent of propylene oxide/ethylene oxide block copolymer which has an average molecular weight from 1000 to 5000 and whose content of ethylene oxide group is in the range from 5 to 60 weight percent based on the average molecular weight of the block copolymer. The ink has a surface tension of 30-40 dyne/cm and a viscosity of 1-10 centipoise. An ink jet ink of this invention can be a combination of three colors, e.g., cyan, magenta and yellow, or four colors (adding black to these colors).

17 Claims, 1 Drawing Sheet

INK CONTAINING PROPYLENE OXIDE/ETHYLENE OXIDE BLOCK COPOLYMERS FOR INK JET RECORDING

This is a Continuation-in-Part of application No. 07/871,173, filed Apr. 20, 1992, now abandoned.

FIELD OF THE INVENTION

This invention relates to a new ink for ink jet recording.

BACKGROUND OF THE INVENTION

A printer based on the so called ink jet process which prints on paper, cloth, film and the like by jetting liquid or solid ink from a nozzle, slit or porous film has been intensely examined for its miniature size, inexpensiveness, quietness and the like. Particularly as a black single-color printer, a printer which prints well on so called plain paper such as reporting pad paper and copy sheets is also desired.

For an ink used in an ink jet printer, the following five features are required. One is being capable of obtaining a uniform image of high density and high resolution free of bleeding and fog. The second is always being good in jettability and jetting stability, free of blindings caused by ink drying at the tip of the nozzle. The third is having quick drying property on a paper. The fourth is having fastness of image, and the fifth is having long-term preservation stability.

To satisfy these requirement, various additives and water soluble organic solvents are being examined. For example, in Japanese examined patent publication Sho. 62-11781, the use of interfacial active agent is described. In Japanese unexamined patent publications Sho. 62-89776 and Hei. 1-25789, the use of block copolymer consisting of ethylene oxide and propylene oxide is described.

In conventionally proposed inks, however, one having all of above described five features has not been obtained. On the other hand, although ink jet printers capable of producing full-color images are also desired, when printing on plain paper, they suffer from poor drying property, disturbance of high speed printer output, and mixture of different color tones, which leads to poor image rendering. Therefore, it is necessary to use particular surface treated dedicated paper, which results in high cost and difficulty in popularization of it as a general purpose printer.

SUMMARY AND OBJECTS OF THE INVENTION

Accordingly, it is an object of the present invention to overcome these and other difficulties encountered in the prior art.

It is a further object of the present invention to provide an ink capable of producing a visible high-resolution color image on plain papers such as reporting pad paper, copy sheets, bond paper, wood free paper and the like.

It is a further object of the present invention to provide an ink satisfying all the above described conditions.

It is a further object of the present invention to provide an ink free of blindings at the tip of the nozzle and capable of long-term preservation.

It is a further object of the present invention to provide an ink for thermal ink jet or for ink jet recording using piezo type ink jet recording, ultrasonic wave or electric field.

Particularly, it is an object of the present invention to provide an ink for ink jet recording which renders full-color images visibly and stably on plain papers.

Additional objects and advantages of the invention will be set forth in part in the description which follows and in part will be apparent to a person with ordinary skill in the art from the description, or may be learned by practice of the invention.

This invention relates to an ink jet ink comprised of dye, water, and water soluble organic solvent which dissolves the dye, and from 0.8 to 5 weight percent of block copolymer consisting of propylene oxide and ethylene oxide (hereinafter called "a block copolymer" in this specification) which has an average molecular weight from 1,000 to 5,000 and whose content of ethylene oxide group is in the range from 5 to 60 weight percent of the average molecular weight. The ink has a surface tension of 30–40 dyne/cm and a viscosity of 1–10 centipoise.

BRIEF DESCRIPTION OF THE DRAWING

The manner by which the above objects and other objects, features and advantages of the present invention are attained will be fully evident from the following detailed description when it is considered in light of the accompanying drawing, wherein.

DETAILED DESCRIPTION OF PREFERRED EMBODIMENTS

Figure 1:
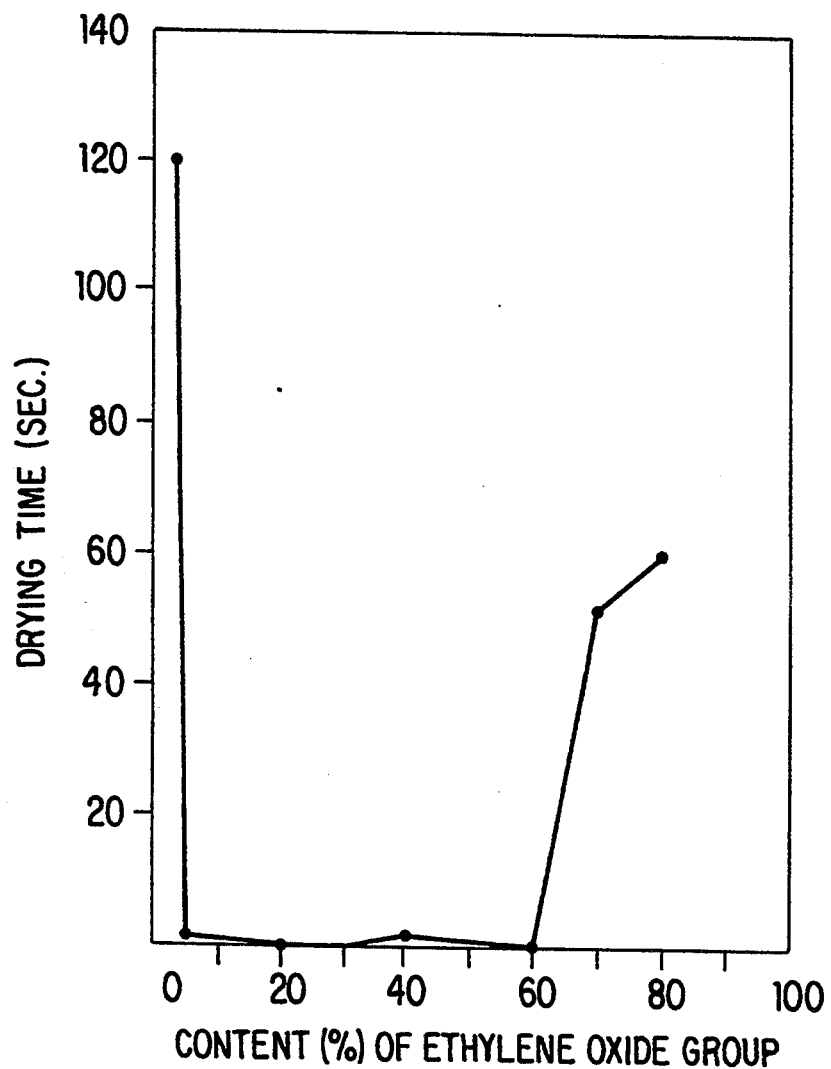
FIG. 1 is a graph which shows the relation between content of ethylene oxide group and drying time in Example 1.

An ink for ink jet recording of this invention can be a single color such as black, a combination of three colors, such as Cyan, Magenta and Yellow, or a combination of four colors adding black to these colors.

The drying property of an ink mostly depends not on the type of papers, but on the permeability of ink to the paper. In order to make ink dry on plain paper more quickly, ink wettability to the paper surface and ink penetration into the paper should be promoted. For that, as is described in Japanese examined patent publication Sho. 62-11781, a process in which from 1.3 to 25 weight percent of interfacial active agent is added into the ink is considered. However, in this process, ink foaming and too good wettability of ink with the ink jet head causes ink flooding from the ink jet head. It is also difficult to get stable jetting because of the viscosity increase of the ink. Strike through, the penetration of ink into the back side of paper, also often occurs, and it leads to poor images at full color mixing. And, in so called thermal ink jet processes utilizing thermal energy, the problem of kogation, which is a technical term of the ink jet art meaning scorching or singeing, to ink jet head parts occurs depending on the type of interfacial active agent. In Japanese examined patent publication Hei. 1-25789 and Japanese unexamined patent publication Sho. 62-89776, inks containing a copolymer of propylene oxide and ethylene oxide are proposed. Although single-color image bleeding, drying-property and initial jetting property of ink are improved in these inks, problems concerning jetting stability and full-color images still remain.

As a result of the intense examination for obtaining an ink capable of producing a visible color image free of bleeding, particularly on plain paper, it was found that an ink for ink jet recording having surface tension at a temperature of 20° C. from 30 to 40 dyne/cm, viscosity at a temperature of 20° C. from 1 to 10, preferably, from 1 to 5 cp, having about from 0.8 to 5 weight percent of specified block copolymer consisting of propylene oxide and ethylene oxide and having about from 1000 to 5000 of average molecular weight and whose content of ethylene oxide group is in the range from 5 to 60 weight percent based on average molecular weight is capable not only of avoiding the above described problems, promoting remarkably the penetration of ink into plain paper and improving the drying property of ink on plain paper to a large extent, but also of being free of ink foaming and ink flooding from the ink jet head, satisfying all the characteristics required and rendering good full-color images.

In this invention, molecular weight of the above described block copolymer is calculated from the amount of OH group, and content of ethylene oxide group is calculated from the difference between the total amount of charged monomer at polymerization and the amount of non-polymerized monomer.

The average molecular weight of the block copolymer used in this invention is in the range from 1,000 to 5,000, preferably from 2,000 to 5,000, and the content of the ethylene oxide group is from 5 to 60 weight percent, preferably from 20 to 50 weight percent, based on the average molecular weight.

A copolymer having an average molecular weight of 900 or more in the propylene oxide part is preferable. The average molecular weight in the propylene oxide part is generally from 900 to 5,000, preferably from 1,500 to 2,500, and most preferably from 1,800 to 2,000.

When the average molecular weight of the above described block copolymer exceeds 5,000, ink viscosity has a tendency to rise extremely. This is not good for jetting and easily brings about clogging, and then images with nonuniformity tend to be formed. On the other hand, when the average molecular weight becomes less than 1,000, the ink tends to bleed extremely, which leads to images with bleeding.

When the content of ethylene oxide group in the block copolymer is more than 60 weight percent, solubility of the ink to water or water soluble organic solvent becomes too high. This leads to unstable surface layer forming of block copolymer on ink drop surface, and this may cause poor results. On the other hand, when the content of ethylene oxide group is less than 5 weight percent, solubility of ink to water or water soluble organic solvent tends to be low, leading to nonuniform ink structure. As a result, in this case, good results are not obtained either.

If the average molecular weight of the propylene oxide part is less than 900, the above described block copolymer may not cover the droplet surface well enough and large quantity of the above described block copolymer is required. As a result, the permeability of ink to a plain paper is improved, but bleeding of images, spreading of character images and clogging may occur, which lead to a decline of reliability.

The block copolymer of propylene oxide and ethylene oxide of this invention is represented by the following general formula:

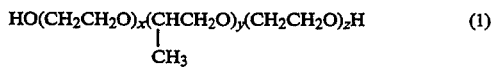 (1)

wherein x, y and z each represents an integral number, or

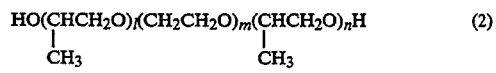 (2)

wherein l, m and n each represents an integral number.

In this invention, two or more types of the above described block copolymers can be mixed. If the content of ethylene oxide in the mixture is from 5 to 60 weight percent, the content of ethylene oxide in each copolymer is not necessarily from 5 to 60 weight percent of each average molecular weight.

In this invention, the amount of the above described block copolymer included in the ink is in the range from 0.8 to 5 weight percent, preferably, from 1.0 to 4.0 weight percent. When the amount of block copolymer in the ink is less than 0.8 weight percent, enough effect does not appear. When it is more than 5 weight percent, ink viscosity rises remarkably and jetting becomes unstable, and as a result, poor image quality is obtained.

An ink for ink jet recording of this invention can also contain the below described compound (3). The compound is:

$$C_nH_{2n+1}O(CH_2CH_2O)_mH \quad (3)$$

In this formula, n is specified to be from 3 to 6 and m is specified to be from 1 to 3. If n is less than 3, the permeability of ink to plain paper is not enough, and if it is more than 6, compatibility of the compounds of formula 3 with water is not enough, either. If m is more than 3, compatibility of the compounds of formula 3 with water is too good to make a satisfactory effect of permeability of ink to plain paper. For example, compounds such as $C_3H_7O(CH_2CH_2O)_2H$, $C_4H_9O(CH_2CH_2O)_3H$, $C_5H_{11}O(CH_2CH_2O)_2H$ and $C_6H_{13}O(CH_2CH_2O)_2H$ can be used.

One or more kinds of compounds represented by formula 3 can be used as an ink component. The content of these compounds in ink may be from 1 to 20, preferably from 3 to 10 weight percent to improve the permeability of ink to plain paper. If the content is less than 1 weight percent, the effect tends to be not enough, and if the content is more than 20 weight percent, excessive spreading of linear images on plain paper, image defects brought about by the deterioration of droplet forming at ink jetting, tends to occur. Solubility of dye also tends to decline, which leads to clogging.

When compound (3) is present, the acceptable amount of the block copolymer is broadened. Thus, for example, the block copolymer may be present in an amount of from 0.1 to 8 weight percent.

The surface tension of ink jet ink of this invention is in the range from 30 to 40 dyne/cm at a temperature of 20° C. and its viscosity is in the range from 1 to 10 cp at a temperature of 20° C. When the surface tension at a temperature of 20° C. is less than 30 dyne/cm, ink flooding from the ink jet head occurs and the resultant dots enlarge remarkably, which leads to poor images. On the other hand, when the surface tension at a temperature of 20° C. is more than 40 dyne/cm, ink wettability to paper is unsatisfactory and the ink is not easily dried, which do not enable the improvement of ink drying time. When the viscosity is less than 1 cp at a temperature of 20° C., splash and bleeding of ink becomes remarkable, together with excessive bleeding of ink from the nozzle, and the image is also unsatisfactory. When the viscosity is more than 10 cp, ink fluidity is unsatisfactory and jetting stability is not obtained. The more preferable viscosity is in the range from 1 to 5 cp.

Specific examples of the water soluble organic solvent used in this invention include but are not limited to polyvalent alcohols such as ethylene glycol, diethylene glycol, propylene glycol, butylene glycol, triethylene glycol, tetraethylene glycol, polyethylene glycol, polypropylene glycol and glycerin; glycol ethers such as ethylene glycol monomethyl ether, diethylene glycol monomethyl ether, diethylene glycol monoethyl ether, diethylene glycol monobutyl ether, and propylene glycol monomethyl ether; basic solvents such as N-methyl pyrolidone and triethanol amine; or alcohols such as ethyl alcohol, methyl alcohol, isopropyl alcohol and benzyl alcohol. Two or more of these solvents can be mixed. It is preferable that the content of these water soluble organic solvents is about from 5 to 50 weight percent based on the total ink weight.

Each of acidic dye, direct dye, basic dye and disperse dye are useful as the dye. More preferably, acidic dye and/or direct dye are used. Specific examples of them include but are not limited to C.I. Direct Black-17, -19, -32, -80, -151,-154,-168, C.I. Direct Blue-86, -112, -199, C.I. Direct Red-80, C.I. Direct Yellow-86,-142, C.I. Food Black-2, C.I. Acid Black-2,-24,-26,-48,-52,-63,- 172,-194,-208, C.I. Acid Blue-9, -185, -249, -254, C.I. Acid Red-8, -35, -37, -249, -257, Acid Yellow-23 and the like. The content of these dyes is in the range from 0.3 to 15, more preferably from 1 to 8 weight percent based on the total ink weight. These dyes are used independently, in admixture of two or more types of dye, or being mixed with custom colors such as red, blue, green and the like, in addition to the four elementary colors such as Cyan, Magenta Yellow and black.

So called interfacial active agent can be added to the ink of this invention to help stabilize dissolution or dispersion of the above described block copolymer in the ink. Each of nonionic, anionic, cationic or ampholytic surface active agent can be used as an interfacial active agent. Specific examples of nonionic surface active agents include but are not limited to polyoxyethylene nonyl phenyl ether, polyoxyethylene octyl phenyl ether, polyoxyethylene dodecyl phenyl ether, polyoxyethylene alkyl ether, polyoxyethylene fatty acid ester, sorbitan fatty acid ester, polyoxyethylene sorbitan fatty acid ester, fatty acid alkylol amide and the like. Specific examples of anionic surface active agent include but are not limited to alkyl benzene sulfonate salt, alkyl phenol sulfonate salt, alkyl naphthalene sulfonate salt, formalin condensate compounds of alkyl naphthalene sulfonate salt, higher fatty acid salt, sulfate ester salt of higher fatty acid salt, sulfonate salt of higher fatty acid ester, sulfate ester salt and sulfonate salt of higher alcohol/ether, alkyl carboxylic acid salt of higher alkyl sulfonate amide, sulfosuccinic acid dialkyl ester salt and the like. Specific examples of cationic surface active agent include but are not limited to from primary to tertiary amine salts, quaternary ammonium salt and the like. Specific examples of ampholytic surface active agent include but are not limited to betaine, sulfobetaine, sulfate betaine and the like. Among them, anionic surface active agent is preferable. It is preferable in respect of image quality and jetting stability that the concentration of surface active agent in ink is 1 weight percent or less.

Water soluble polymers such as pH conditioner, mildewproof agent, polyethylene imine, polyvinylpyrolidone, cellulose derivatives, polyacrylic acid salts and the like, clathrate compounds such as cyclodextrin, crown ether and the like, viscosity conditioners or conductive agents and the like can be included in the ink of this invention if desired.

Ink thus prepared satisfies all the conditions required in forming a visible high-resolution image on plain paper, and is capable of long-term preservation free of clogging at the tip of an ink jet nozzle. The mechanism with which the image quality and drying property of ink for plain paper in this invention is remarkably improved when the above described block copolymer is added to the ink of specified weight is not necessarily clear. It is considered that as propylene oxide part is a hydrophobic group having appropriate affinity and the block copolymer has appropriate molecular weight, when the ink is jetted from the nozzle and forms an ink droplet, ink forms a stable surface layer near the ink droplet and the ink penetration into paper is promoted; however, excessive spreading and bleeding of dot size are preventable. This phenomenon appears when the composition and molecular weight of block copolymer in this invention and the concentration in ink are in the above described specified ranges. Particularly, this phenomenon is extremely effective in controlling mixed color images at full color image forming.

EXAMPLES

Examples 1, 2 and Comparative Examples 1 to 5

3 parts of C.I. Acid Blue 249
70 parts of deionized water
25 parts of diethylene glycol
a, b, c, d, e, f and g parts of block copolymer
(average molecular weight: 1,700
content of ethylene oxide group: 30 weight percent)

Ink was prepared by applying deaerating treatment using a vacuum pump, after thoroughly mixing and dissolving the above described components and pressure filtering them with a Teflon filter having 1 μm pore diameter.

Ink Evaluating Tests
(1) Ink surface tension
Ink surface tension was measured with a Wilhelmy surface tension balance in an environment of a temperature of 20° C. and a humidity of 50% R.H.
(2) Ink viscosity
Ink viscosity was measured at a shear rate of 1,400/min. in an environment of a temperature of 20° C. and a humidity of 50% R.H.
(3) Image quality test
Printing test of the obtained ink was done by an experimental ink jet printer(300 spi, 192 nozzle) and a modified machine of DeskJet printer(available from Hewlett Packard Co., Ltd.), using FX-L paper(available from Fuji Xerox Co., Ltd.) and a surface coating paper for ink jet (available from Xerox Corporation) as typical plain papers. Density and uniformity of solid image, bleeding and spreading of line image and ink dispersion around the image were studied as evaluation items. Samples in which the same pattern with newspaper color print pattern and newspaper color print are comparatively evaluated by human sensory appeal tests applied to ten people, and are relatively ranked. For the result of this evaluation test, symbols O means satisfactory, Δ means acceptable and x means failure.
(4) Mixed color image In each ink, dye was first replaced by C.I. Acid Red 257 and ink of a', b', c', d', e', f' and g' were prepared. Next, dye was replaced by C.I. Acid Yellow 86 and ink of a", b", c", d", e", f" and g" were also prepare. In both of these preparations, each ink was prepared in the same manner as Examples 1 and 2, and Comparative Examples 1 to 5 except that the dye was changed. Thus, ink sets of three colors, change of dot diameter is ±15% or less. Symbol x means having 11 problems or more until the 100th print and the change of dot diameter is ±15% or more.

These results are shown in Table 1. For the composition of Example 1, the relation between the content of ethylene oxide group and drying time is shown in FIG. 1.

|  | Weight (part) of Block Copolymer of This Invention | Ink Surface Tension (dyne/cm) | Ink Viscosity (cP) | Image Quality on FX-L paper | Image Quality on Surface Coating Paper for Ink Jet | Mixed Color Image Quality | Drying Time (sec.) | Jetting Stability | Comment |
| --- | --- | --- | --- | --- | --- | --- | --- | --- | --- |
| Comparative Example 1 | a | 0 | 60 | 2.0 | Δ | o | x | 150 | o | Ink drying on paper is remarkably bad. Bleeding at color mixing is remarkable. |
| Comparative Example 2 | b | 0.3 | 36 | 2.0 | x | o | x | 80 | o | Bleeding on FX-L paper is remarkable. Bleeding at color mixing is also remarkable. |
| Comparative Example 3 | c | 0.6 | 36 | 2.0 | x | o | x | 50 | o | Bleeding on FX-L paper is remarkable. Bleeding at color mixing is also remarkable. |
| Example 1 | d | 1.0 | 36 | 2.5 | o | o | o | <1.0 | o | Good images were obtained both on FX-L paper and on surface coating paper for ink jet. |
| Example 2 | e | 3.0 | 34 | 4.0 | o | o | o | <1.0 | o | Good images were obtained both on FX-L paper and on surface coating paper for ink jet. |
| Comparative Example 4 | f | 6.0 | 33 | 5.8 | Δ | o | Δ | <1.0 | Δ | Ink jetting from ink jet head is not stable probably because of high ink viscosity. |
| Comparative Example 5 | g | 10.0 | 33 | 13 | — | — | — | — | x | Ink jetting from ink jet head is impossible because of too high ink viscosity. | more in detail, a set of a, a' and a", a set of b, b' and b", a set of c, c' and c", a set of d, d' and d", a set of e, e' and e", a set of f, f' and f" and a set of g, g' and g" were prepared. With these inks, full-color images were formed on the same type of paper as was used in (3). For the results of this evaluation test, symbols O means satisfactory, Δ means acceptable and x means failure.

(5) Drying time test

Solid images having a size of 51 mm × 10 mm were printed on FX-L paper (available from Fuji Xerox Co., Ltd.), 4024 paper (available from Xerox Corporation), reporting pad paper (available from Lion Jimuki Co.) and surface coating paper for ink jet (available from Xerox Corporation) used as plain papers. Surface coating papers for ink jet (available from Xerox Corporation) were put on each of the papers, and then pressure was added onto them. The time until ink is not transferred to the surface coating paper for ink jet any more is considered to be the drying time.

(6) Jetting stability test

Printing test for thus prepared ink is done both in an environment of a temperature of 10° C. and a humidity of 15% R.H. and in an environment of a temperature of 30° C. and a humidity of 85% R.H. The occurrence of non-jetted part and change of dot diameter on the paper were observed. For the result of this evaluation test, symbol O means having no problem until the 100th print and the change of dot diameter is ±10% or less. Symbol Δ means having 10 problems until the 100th print and the Example 3

5 parts of C.I. Direct Black 168
83 parts of deionized water
10 parts of glycerin
2 parts of block copolymer (average molecular weight: 2,500, content of ethylene oxide group: 20 weight percent)

Using the above described components, ink is prepared in the same manner as in the above described Examples 1 and 2. Surface tension of this ink is 37 dyne/cm and the viscosity is 2.4 cp at a temperature of 20° C. When the same tests from (1) to (6) as are described above are applied to this ink, good results are obtained for each test.

Example 4

3 parts of C.I. Food Black 2
80 parts of deionized water
10 parts of diethylene glycol
3 parts of block copolymer (average molecular weight: 4,000, content of ethylene oxide group: 50 weight percent)

Using the above described components, ink is prepared in the same manner as in the above described Examples 1 and 2. Surface tension of this ink is 35 dyne/cm and the viscosity is 2.8 cp at a temperature of 20° C. When the same tests from (1) to (6) as are described above are applied to this ink, good results are obtained for each test.

Example 5

3 parts of C.I. Acid Blue 249
80 parts of deionized water
10 parts of diethylene glycol
5 parts of triethanol amine
3 parts of block copolymer (average molecular weight: 3,000, content of ethylene oxide group: 40 weight percent)

Using the above described components, ink is prepared in the same manner as in the above described Examples 1 and 2. Surface tension of this ink is 35 dyne/cm and the viscosity is 2.8 cp at a temperature of 20° C. When the same tests from (1) to (6) as are described above are applied to this ink, good results are obtained for each test.

Example 6

3 parts of C.I. Acid Red
90 parts of deionized water
10 parts of diethylene glycol
0.2 parts of alkyl benzene sodium sulfonate
3 parts of block copolymer (average molecular weight: 4,000, content of ethylene oxide group: 30 weight percent)

Using the above described components, ink is prepared in the same manner as in the above described Examples 1 and 2. Surface tension of this ink is 35 dyne/cm and the viscosity is 2.9 cp at a temperature of 20° C. When the same tests from (1) to (6) as are described above are applied to this ink, good results are obtained for each test.

Example 7

3 parts of C.I. Direct Blue 199
70 parts of deionized water
10 parts of diethylene glycol
5 parts of isopropyl alcohol
3 parts of block copolymer (average molecular weight: 2,500, content of ethylene oxide group: 30 weight percent)

Using the above described components, ink is prepared in the same manner as in the above described Examples 1 and 2. Surface tension of this ink is 34 dyne/cm and the viscosity is 3.1 cp at a temperature of 20° C. When the same tests from (1) to (6) as are described above are applied to this ink, good results are obtained for each test.

Examples 8 to 10 and Comparative Examples 6 to 10

3 weight percent of C.I.Food Black 2
17 weight percent of diethylene glycol
h, i, j, k, l, m, n and o weight percent of block copolymer
(average molecular weight: 1,700, ethylene oxide part: 30 percent, molecular weight of the ethylene oxide part: 500 approximately, propylene oxide part: 70 percent, molecular weight of the propylene oxide part: 1,200 approximately)
p, q, r, s, t, u, v and w weight percent of $C_4H_9O(CH_2CH_2O)_2H$
rest of deionized water Ink was prepared by applying deaerating treatment using a vacuum pump, after thoroughly mixing and dissolving the above described components and pressure filtering them with a filter having 0.2 μm pore diameter.

Ink of examples 8 to 10 and comparative examples 6 to 10 were prepared by specifying the content of block copolymer to h, i, j, k, l, m, n or o weight percent and the content of $C_4H_9O(CH_2CH_2O)_2H$ to p, q, r, s, t, u, v or w weight percent for each of the examples and comparative examples. The relation between the content of block copolymer and that of $C_4H_9O(CH_2CH_2O)_2H$ is shown in Table 2.

TABLE 2

|  | (a) content of compound 3 (weight percent) | | (b) content of block copolymer (weight percent) |
| --- | --- | --- | --- |
| Example 8 | p | 10 | h | 1 |
| Example 9 | q | 5 | i | 4 |
| Example 10 | r | 10 | j | 2 |
| Comparative Example 6 | s | 5 | k | 0 |
| Comparative Example 7 | t | 10 | l | 0 |
| Comparative Example 8 | u | 0.5 | m | 4 |
| Comparative Example 9 | v | 5 | n | 9 |
| Comparative Example 10 | w | 22 | o | 2 |

The same tests as Example 1 and 2 are applied to each ink obtained in examples 8 to 10 and comparative examples 6 to 10 except that in the mixed color image test (4), C.I.Direct Blue 199 is used instead of C.I.Food Black, and ink of A, B, C, D, E, F and G are obtained.

Results of each tested item for Examples 8 to 10 and Comparative Examples 6 to 10 are shown in Table 3.

TABLE 3

|  | Ink Surface Tension (dyn/cm) | Ink Viscosity (cP) | Single-colored Image Quality on FX-L paper | Image Quality on Surface Coating Paper for Ink Jet | Mixed Color Image Quality on FX-L paper | Drying Time (sec.) | Jetting Stability | Comment |
| --- | --- | --- | --- | --- | --- | --- | --- | --- |
| Example 8 | 33 | 2.3 | ○ | ○ | ○ | <1 | ○ | *1 |
| Example 9 | 35 | 2.6 | ○ | ○ | ○ | <1 | ○ | *2 |
| Example 10 | 34 | 2.5 | ○ | ○ | ○ | <1 | ○ | *3 |
| Comparative Example 6 | 42 | 2.0 | x | ○ | x | <1 | Δ~○ | *4 |
| Comparative Example 7 | 33 | 2.2 | Δ | ○ | Δ | <1 | Δ | *4 |
| Comparative Example 8 | 35 | 2.5 | Δ | ○ | Δ | <1 | ○ | *5 |
| Comparative Example 9 | 33 | 7.2 | — | — | — | — | x | *6 |
| Comparative | 31 | 4.0 | x | ○ | Δ | <1 | Δ | *7 |

TABLE 3-continued

|  | Ink Surface Tension (dyn/cm) | Ink Viscosity (cP) | Single-colored Image Quality on FX-L paper | Image Quality on Surface Coating Paper for Ink Jet | Mixed Color Image Quality on FX-L paper | Drying Time (sec.) | Jetting Stability | Comment |
| --- | --- | --- | --- | --- | --- | --- | --- | --- |
| Example 10 |  |  |  |  |  |  |  |  |

*1: Good images are obtained both on FX-L paper and surface coating paper for ink jet. Long-term jetting stability is also good.
*2: Good images are obtained both on FX-L paper and surface coating paper for ink jet.
*3: Good images are obtained both on FX-L paper and surface coating paper for ink jet. Reproducing property of color images on plain paper is also good.
*4: Spreading of characters on FX-L paper occurs. Ink flooding from the head part also occurs.
*5: Nonuniformity of solid image part on FX-L paper occurs.
*6: Jetting from the head is unstable because of too high ink viscosity.
*7: Unstable jetting and image defects tend to occur.

Example 11

3 weight percent of C.I.Direct Black-168
9 weight percent of ethylene glycol
2 weight percent of block copolymer
(average molecular weight: 3,000 approximately, content of ethylene oxide group: 40 percent, molecular weight of the ethylene oxide group: 1,200 approximately, content of propylene oxide group: 60 percent, molecular weight of the propylene oxide group: 1,800)
15 weight percent of $C_4H_9O(CH_2CH_2O)_2H$
rest of deionized water Using the above described components, ink is prepared in the same manner as in the above described Example 8. Surface tension of this ink is 34 dyn/cm and the viscosity is 2.6 cP at a temperature of 20° C. When the same tests as in above described Example 8 are applied to this ink, good results are obtained for each test, especially concerning bleeding at color mixing.

Comparative Example 11

The same ink as in Example 11 is prepared except for using $C_2H_5O(CH_2CH_2O)_2H$ instead of $C_4H_9O(CH_2CH_2O)_2H$. Surface tension of this ink is 38 dyn/cm and the viscosity is 2.5 cP at a temperature of 20° C. When the same tests as in above described Example 8 are applied to this ink, both single-color and mixed color bleeding on FX-L paper are considerable.

Comparative Example 12

The same ink as in Example 9 is prepared except for changing the molecular weight of the block copolymer to 1,000 approximately, the content of ethylene oxide part of the block copolymer to 20 percent and the molecular weight of propylene oxide part of the block copolymer to 800 approximately. Surface tension of this ink is 38 dyn/cm and the viscosity is 2.5 cP at a temperature of 20° C. When the same tests as in above described Example 8 are applied to this ink, bleeding at color mixing on FX-L paper is considerable.

Example 12

3 weight percent of C.I. Acid Blue-249
12 weight percent of glycerin
5 weight percent of triethanol amine
2 weight percent of block copolymer
(average molecular weight: 2,700, content of ethylene oxide group: 40 percent, content of propylene oxide group: 60 percent, molecular weight of the propylene oxide group: 1,080)
8 weight percent of $C_6H_{13}O(CH_2CH_2O)_3H$
rest of deionized water Using the above described components, ink is prepared in the same manner as in the above described Example 8. Surface tension of this ink is 34 dyn/cm and the viscosity is 2.9 cP at a temperature of 20° C. When the same tests as in above described Example 8 are applied to this ink, good results are obtained for each test, especially concerning dot shape on plain paper.

Example 13

3 weight percent of C.I. Acid Red-37
15 weight percent of ethylene glycol
0.2 weight percent of alkyl benzene sodium sulfonate
3 weight percent of block copolymer
(average molecular weight: 2,500 approximately, content of ethylene oxide part: 20 percent, content of propylene oxide part: 80 percent, molecular weight of the propylene oxide part: 2,000 approximately)
8 weight percent of $C_4H_9O(CH_2CH_2O)_3H$
rest of deionized water Using the above described components, ink is prepared in the same manner as in the above described Example 8. Surface tension of this ink is 33 dyn/cm and the viscosity is 3.0 cP at a temperature of 20° C. When the same tests as in above described Example 8 are applied to this ink, good results are obtained for each test. The result concerning clogging is also considerably good.

Comparative Example 13

Ink is prepared in the same manner as in above described Example 13 except for using 3.2 weight percent in total of alkyl benzene sodium sulfonate instead of block copolymer of Example 13. Surface tension of this ink is 29 dyn/cm and the viscosity is 2.8 cP at a temperature of 20° C. When the same tests as in above described Example 8 are applied to this ink, spreading of images on plain paper is considerable and image defects and kogation, which is a technical term of the ink jet art meaning scorching or singeing, of heater parts are observed at print testing.

Example 14

3 weight percent of C.I. Acid Red-37
15 weight percent of ethylene glycol
1 weight percent of block copolymer
(average molecular weight: 4,000 approximately, content of ethylene oxide part: 20 percent, content of propylene oxide part: 80 percent, molecular weight of the propylene oxide part: 3,200 approximately)
4 weight percent of $C_3H_7O(CH_2CH_2O)_2H$
rest of deionized water Using the above described components, ink is prepared in the same manner as the above described Example 8. Surface tension of this ink is 37 dyn/cm and the viscosity is 2.4 cP at a temperature of 20° C. When the same tests as in above described Example 8 are applied to this ink, good results are obtained for each test. Images of high resolution with small amount of splash are obtained both on plain paper and silica coated paper.

Example 15

3 weight percent of C.I. Acid Red-37
15 weight percent of diethylene glycol
1 weight percent of block copolymer
(average molecular weight: 2,000 approximately, content of ethylene oxide part: 20 percent, content of propylene oxide part: 80 percent, molecular weight of the propylene oxide part: 1,600 approximately)
4 weight percent of $C_6H_{13}O(CH_2CH_2O)_2H$
rest of deionized water Using the above described components, ink is prepared in the same manner as in the above described Example 8. Surface tension of this ink is 34 dyn/cm and the viscosity is 2.6 cP at a temperature of 20° C. When the same tests as in above described Example 8 are applied to this ink, good results are obtained for each test. Mixed color bleeding also decreased greatly.

What is claimed is:

1. An ink for ink jet recording comprising:
at least one dye;
water;
at least one water soluble organic solvent which dissolves the dye;
and from 0.8 to 5 weight percent of at least one block copolymer consisting of propylene oxide and ethylene oxide, said at least one copolymer having an average molecular weight from 1,000 to 5,000 and a content of ethylene oxide in the range from 20 to 50 weight percent based on total average molecular weight of the copolymer, said ink having a surface tension from 30 to 40 dyne/cm at 20° C. and having a viscosity from 1 to 10 centipoise at 20° C.

2. The ink of claim 1, wherein said viscosity is from 1 to 5 centipoise at 20° C.

3. The ink of claim 1, wherein said average molecular weight is from 2,000 to 5,000.

4. The ink of claim 1, wherein said at least one copolymer is a mixture of copolymers.

5. The ink of claim 1, containing 1.0 to 4.0 weight percent of said at least one copolymer.

6. The ink of claim 1, wherein said at least one solvent is present in an amount of about 5 to 50 weight percent based on total ink weight.

7. The ink of claim 1, wherein said at least one dye is a mixture of dyes.

8. The ink of claim 1, wherein said at least one dye is present in an amount of 0.3 to 15 weight percent based on total ink weight.

9. The ink of claim 1, wherein said at least one dye is present in an amount of 1 to 8 weight percent based on total ink weight.

10. The ink of claim 1, further comprising at least one interfacial active agent.

11. The ink of claim 10, wherein said interfacial active agent is present in an amount of no more than one weight percent based on the total ink weight.

12. The ink of claim 10, wherein said interfacial active agent is an anionic surface active agent.

13. The ink of claim 1, wherein the propylene oxide polymer part has an average molecular weight not less than 900.

14. An ink for ink jet recording, comprising:
at least one dye;
water;
at least one water soluble organic solvent which dissolves the dye;
from 0.8 to 5 weight percent of at least one block copolymer consisting of propylene oxide and ethylene oxide, said at least one copolymer having an average molecular weight from 1,000 to 5,000 and a content of ethylene oxide in the range from 5 to 60 weight percent based on the total average molecular weight of the copolymer, said ink having a surface tension from 30 to 40 dyne/cm at 20° C. and having a viscosity from 1 to 10 centipoise at 20° C., and
from 1 to 20 weight percent of at least one compound represented by general formula (3)

$$C_nH_{2n+1}O(CH_2CH_2O)_mH \qquad (3)$$

wherein n represents an integer from 3 to 6 and m represents an integer from 1 to 3.

15. An ink for ink jet recording comprising:
at least one dye;
water;
at least one water soluble organic solvent which dissolves the dye;
from 1 to 20 weight percent of at least one compound represented by general formula (3)

$$C_nH_{2n+1}O(CH_2CH_2O)_mH \qquad (3)$$

wherein n represents an integer from 3 to 6 and m represents an integer from 1 to 3;
and from 0.1 to 8 weight percent of at least one block copolymer consisting of propylene oxide and ethylene oxide, said at least one copolymer having an average molecular weight from 1,000 to 5,000 and a content of ethylene oxide in the range from 5 to 60 weight percent based on the total average molecular weight of the copolymer, and containing a propylene oxide polymer part having an average molecular weight not less than 900, said ink having a surface tension from 30 to 40 dyne/cm at 20° C.

16. The ink of claim 15, wherein the propylene oxide polymer part has an average molecular weight from 1,500 to 2,500.

17. The ink of claim 15, wherein the propylene oxide polymer part has an average molecular weight from 1,800 to 2,000.

* * * * *